(12) United States Patent
Andrew et al.

(10) Patent No.: US 9,291,328 B1
(45) Date of Patent: Mar. 22, 2016

(54) INTERIOR LENS FOR A LIGHT BAR

(71) Applicant: STAR HEADLIGHT & LANTERN CO., INC., Avon, NY (US)

(72) Inventors: Tracy L. Andrew, Livonia, NY (US); Stephen T. Vukosic, Avon, NY (US); R. Michael Datz, Rochester, NY (US); Elvis Pacavar, Penfield, NY (US); Andrew Mack, Livonia, NY (US)

(73) Assignee: Star Headlight & Lantern Co., Inc., Avon, NY (US)

( * ) Notice: Subject to any disclaimer, the term of this patent is extended or adjusted under 35 U.S.C. 154(b) by 0 days.

(21) Appl. No.: 14/042,150

(22) Filed: Sep. 30, 2013

Related U.S. Application Data

(60) Provisional application No. 61/707,941, filed on Sep. 29, 2012.

(51) Int. Cl.
*F21V 5/00* (2015.01)
*F21V 13/04* (2006.01)

(52) U.S. Cl.
CPC ............... *F21V 5/007* (2013.01); *F21V 13/04* (2013.01)

(58) Field of Classification Search
CPC .............................. B60Q 1/2611; F21S 4/008
See application file for complete search history.

(56) References Cited

U.S. PATENT DOCUMENTS

| | | | |
|---|---|---|---|
| 5,884,997 A * | 3/1999 | Stanuch et al. | 362/493 |
| D499,976 S | 12/2004 | Neufeglise et al. | |
| 7,008,079 B2 * | 3/2006 | Smith | 362/235 |
| D564,928 S | 3/2008 | Belitz et al. | |
| 7,513,659 B2 * | 4/2009 | Vukosic et al. | 362/373 |
| D604,188 S | 11/2009 | Shin | |
| D608,674 S | 1/2010 | Lyons | |
| D627,247 S | 11/2010 | Shin | |
| D632,199 S | 2/2011 | Jacobs et al. | |
| D632,421 S | 2/2011 | Vukosic et al. | |
| 7,997,769 B2 * | 8/2011 | Foo | 362/294 |
| D663,227 S | 7/2012 | Andrew et al. | |
| D668,168 S | 10/2012 | Chen | |
| D683,252 S | 5/2013 | Andrew et al. | |
| 2007/0024461 A1 * | 2/2007 | Pederson et al. | 340/815.45 |
| 2008/0310159 A1 * | 12/2008 | Chinniah et al. | 362/244 |
| 2009/0207612 A1 * | 8/2009 | Datz et al. | 362/249.14 |
| 2010/0091499 A1 * | 4/2010 | Jiang et al. | 362/268 |
| 2010/0110677 A1 * | 5/2010 | Stein | 362/235 |
| 2011/0249445 A1 * | 10/2011 | Vasta et al. | 362/296.08 |
| 2012/0140466 A1 * | 6/2012 | Yang et al. | 362/235 |
| 2013/0120985 A1 * | 5/2013 | Jiang et al. | 362/235 |

* cited by examiner

*Primary Examiner* — Elmito Breval
(74) *Attorney, Agent, or Firm* — Kenneth J. Lukacher Law Group

(57) ABSTRACT

An interior lens is provided for a light bar mountable onto the roof of a vehicle. The interior lens has a plurality of fluted lenses or lens segments forming a ribbon shaped to receive illumination prior to exiting the light bar outer dome. The fluted lenses extend vertically parallel to each other and are each shaped to increase the horizontal viewing angle of light from the light bar. The ribbon of fluted lenses may continuously extend within the light bar around the optical assembly to improve performance of light projected from different sides of the light bar, thereby providing an improved optical assembly for a light bar.

21 Claims, 5 Drawing Sheets

INTERIOR LENS FOR A LIGHT BAR

Priority is claimed to U.S. Provisional Patent Application No. 61/707,941, filed Sep. 29, 2012, which is herein incorporated by reference.

FIELD OF THE INVENTION

The present invention relates to an interior lens for a light bar, and particularly to an interior lens for a light bar composed of vertically disposed fluted lenses or lens segments for dispersing incident light (e.g., by diffusing and/or refracting) produced by light sources of the light bar. Such interior lens may be transparent, of a color, or have portions of different colors, so as to provide desired colors of light from the light bar.

BACKGROUND OF THE INVENTION

Light bars are mounted on the roof of vehicles, such as police, fire, or other emergency vehicles to provide warning lights. It is important that such warning light which may flash, rotate, or patterns are viewable over a wide angle. Such light bars are available from Star Headlight and Lantern Company of Avon, New York. When light sources, such as LEDs, are used in light bars, it is important that light from such light sources spread light outward from the light bar. Typically in light bars, such as prior art light bar 1 of FIG. 1, to use a parabolic reflector 2 behind LEDs 3 provided in banks. In this example, four parabolic reflectors 2a, 2b, 2c, and 2d are shown each reflecting LED light incident thereto. FIG. 2 shows the parabolic reflectors 2 apart from light bar 1. The parabolic reflectors 2 and LEDs 3 form the optical assembly of light bar 1. The parabolic reflectors 2 are mounted on a base 4 and collect and reflect light from their respective LEDs 3 that would otherwise not be emitted in the desired outward direction towards the light bar dome 5. Although useful, the reflected light in light bar 1 is limited in its viewing angle, and then illumination from the light bar may not have desired dispersion characteristics, such as in terms of uniformity or viewing angles of individual LED's. FIG. 3 shows the use of two optical assemblies of parabolic reflectors 2 and LEDs 3 along the left and right of a prior art light bar 1a, which like light bar 1 is mountable onto the roof of a vehicle.

Although lenses for controlling dispersion characteristics have been used in vehicle lamps, such as described in U.S. Pat. No. 5,373,430, such have not been used heretofore on light bars between illumination light sources and the outer light bar dome.

SUMMARY OF THE INVENTION

Accordingly, it is an object of the present invention to improve dispersion characteristics in light bars by the addition of an interior fluted lens providing wider viewing angles of the individual LEDs than if such interior lens were not present between the light bar's optical assembly and exterior dome.

Briefly described, the present invention embodies an optical element providing an interior lens for a light bar. The body of the optical element has a plurality of fluted lenses (or lens segments) forming a ribbon shaped to receive illumination prior to exiting an outer dome of the light bar. The fluted lenses are shaped to increase the viewing angle of light from the light bar.

Preferably the interior lens is located between the dome and parabolic reflectors located behind light sources, such parabolic reflectors reflect light received from the light sources (such as LEDs). The illumination from the light sources, and their reflected light from parabolic reflectors, is projected to the dome, via the interior lens, and out the sides of the light bar. The light sources and parabolic reflectors form the internal optical assembly of the light bar. The ribbon of fluted lenses may continuously extend within the light bar around the optical assembly to improve viewing angle performance of the light bar, thereby providing an improved optical assembly for a light bar.

The fluted lenses or lens segments may extend along a first dimension (or vertically) parallel to each other and are each shaped to disperse (e.g., increase the viewing angle) of incident illumination in a second dimension (or horizontally).

The interior lens may releasably attach by clipping onto the reflectors. Also, the interior lens may be transparent, of a color, or have portions of different colors, so as to provide the desired color of light from the light bar.

The present invention further embodies a light bar having a base, an optical assembly disposed upon the base providing illumination towards different sides of the light bar, a dome covering the base to contain the optical assembly therein, and an interior lens having a plurality of fluted lens segments shaped to increase the viewing angle of illumination received from the optical assembly prior to exiting different sides of the light bar via the dome.

The interior lens when located in a light bar forms part of the optical assembly of the light bar. As such, an optical assembly for a light bar may be provided by the present invention having an optical element having fluted lenses, one or more light sources providing illumination, at least one parabolic reflector which reflects light received from the light sources towards the optical element, and the lenses of the optical element being shaped to increase viewing angle of received illumination from the light sources and the parabolic reflector.

The term light bar may refer to any light bar mountable onto the roof of a vehicle having an optical assembly which projects light outward from the side(s) of the light bar.

BRIEF DESCRIPTION OF THE DRAWINGS

The foregoing objects, features and advantages of the invention will become more apparent from a reading of the following description in connection with the accompanying drawings, in which.

DETAILED DESCRIPTION OF THE INVENTION

Figure 10:
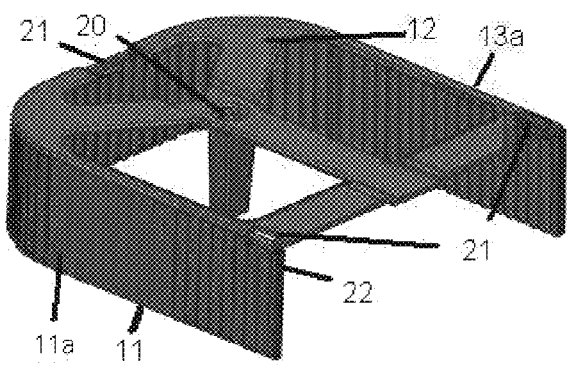
FIG. 10 is a perspective view of one of the two halves of the interior lens of FIG. 4.

Referring to FIGS. 4 to 12, a lens (or optical element) 10 of the present invention is shown having a body 11 composed of multiple parallel lenses, referred to herein as flutes or lens segments 11a, that form a ribbon extending along two elongated sides 9a, 9b and curved ends 9c, 9d. The shape of lens 10 is in accordance with the extent of the reflectors 2 when lens 10 is positioned over such reflectors, as discussed later below. Each lens segment 11a extends vertically from the top and bottom of lens 10. The lens 10 is made of molded plastic formed by left and right mirrored halves 13a and 13b (e.g., a single half 13a is shown in FIG. 10) which align with each other along their respective edge 22 (see FIG. 9) when properly positioned in a light bar.

Alternatively, lens halves 13a and 13b may be joined, such as by adhesive, to each other along their edges 22, when lens 10 is manufactured. In a further alternative, lens 10 may be a unitary plastic structure when molded.

Figure 4:
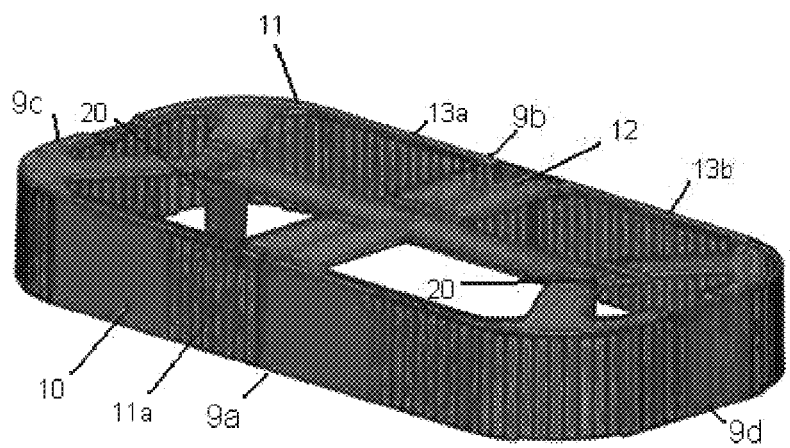
FIG. 4 is a perspective view of the interior lens in accordance with the present invention having a plurality of vertical fluted lens segments.
Figure 5:
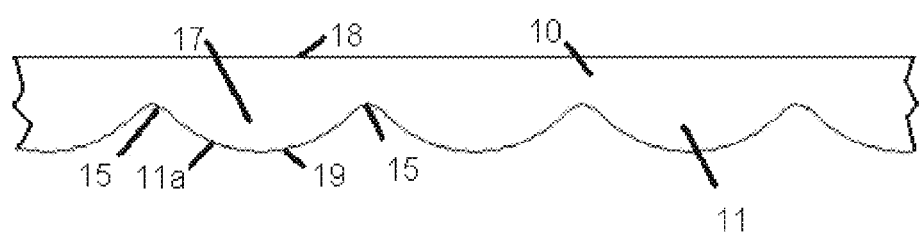
FIG. 5 is a cross-sectional view taken horizontally through part of the interior lens of FIG. 4.
Figure 6:
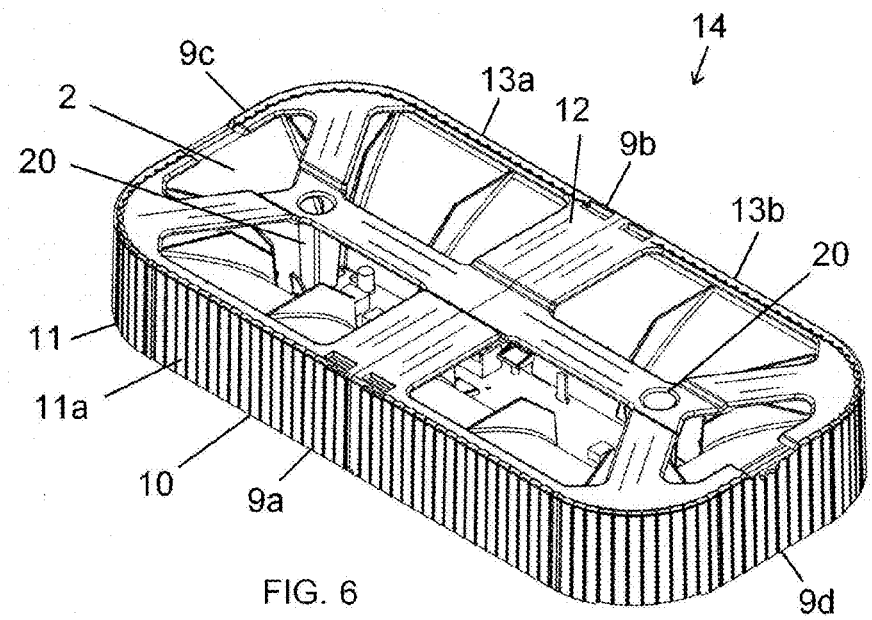
FIG. 6 is a perspective view of the interior lens of FIG. 4 mounted onto the optical assembly of a light bar.

FIG. 5 shows a detailed partial cross-sectional view of lens 10 of FIG. 4. Lens segments 11a provide light diffusing humps 17 along the interior surface of lens 10. Such cross-section of each hump 17 being the same at it extends vertically, and between each adjacent hump 17 is a valley 15. Each lens segment 11a has a smooth outer surface 18 continuous with its adjacent lens segments 11a with a curved (or convex) inner surface 19. The radius of curvature of curved surface 19 may be, for example, 3/16 inches, but other radius values may be used which provides the desired horizontal diffusion (by refraction) of light produced by LEDs incident the surface of hump 17. Alternatively, lens segments 11a may have humps 17 along their outer surfaces 18 with inner surfaces 19 being smooth to obtain a similar effect of diffusion of light.

Figure 1:
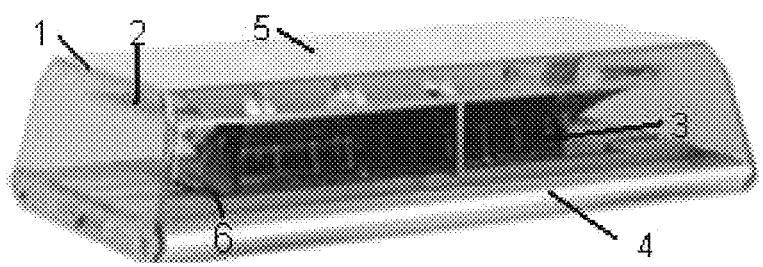
FIG. 1 is an example of a light bar of the prior art without the interior lens of the present invention.
Figure 2:
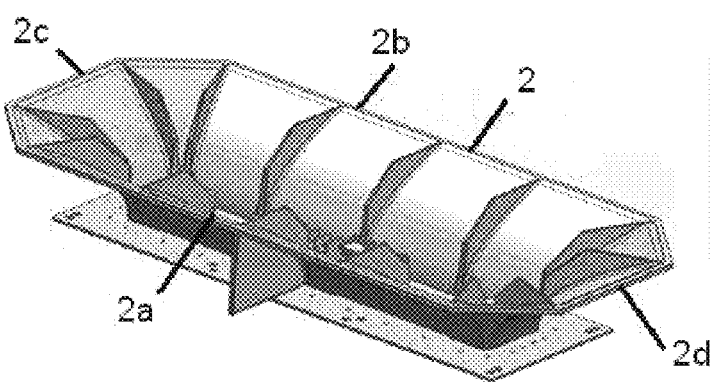
FIG. 2 is an example of the parabolic reflectors of the optical assembly of the prior art light bar of FIG. 1.

As shown in FIGS. 6, 7, 8, and 9, lens 10 is positioned over the optical assembly of the parabolic reflectors 2 and LEDs 3 shown in FIG. 1 to provide an improved optical assembly 14. Each of the lens halves 13a and 13b has three clips 21 which latch or clip onto the top edge of that portion of reflector 2 adjacent thereto when properly positioned in the light bar, thereby securing or retaining the lens 10 to reflector 2 and thus providing optical assembly 14. For example, clips 21 may be provided by one or more flanges, tabs, or other features which releasably attach lens 10 to reflector 2.

Figure 7:
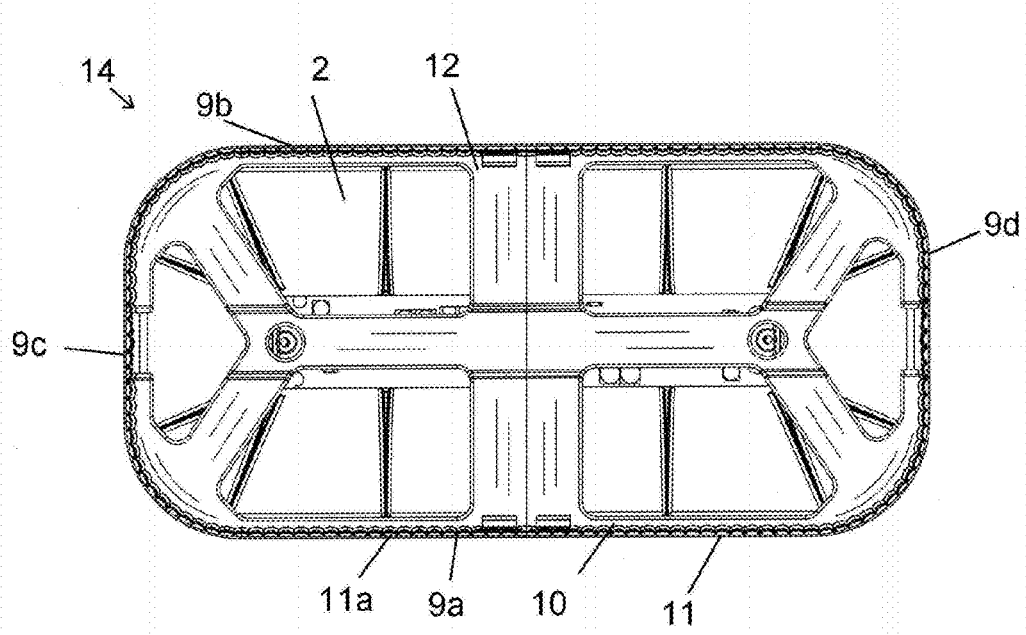
FIG. 7 is a top view of the interior lens and optical assembly of FIG. 6.
Figure 8:
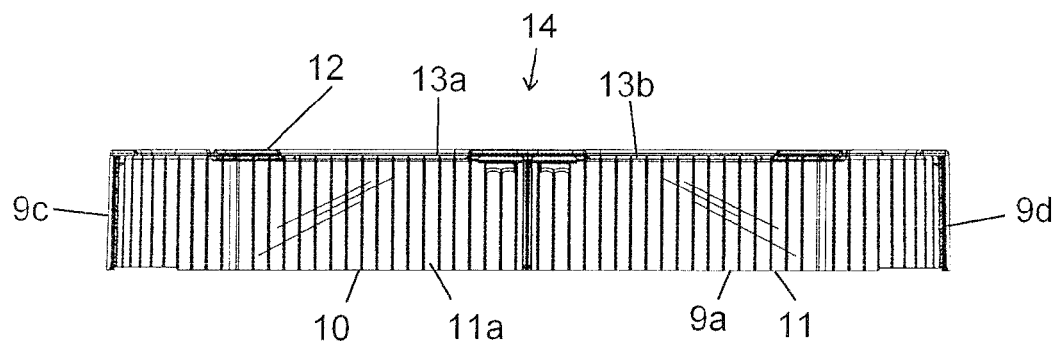
FIG. 8 is view of one of the sides of the interior lens of FIG. 4.
Figure 9:
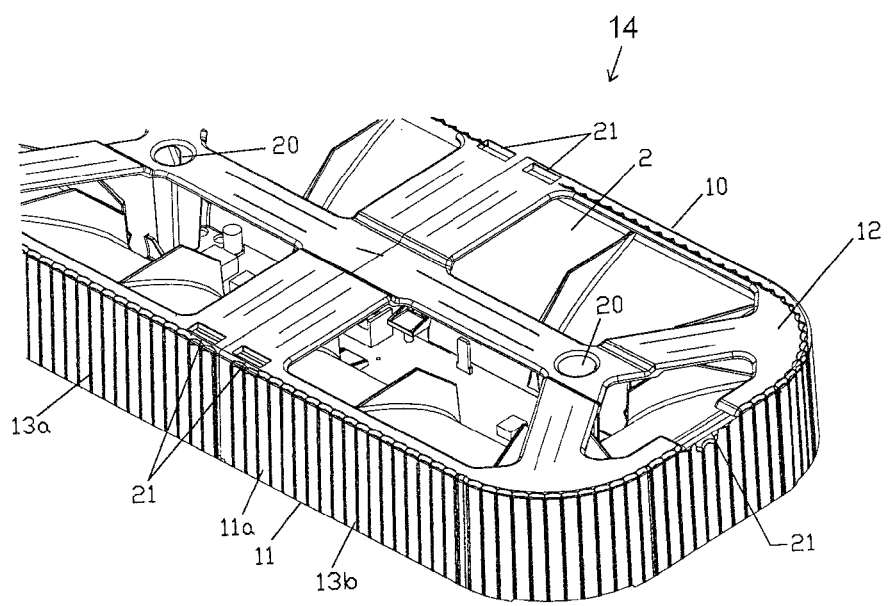
FIG. 9 is a partial perspective view of the interior lens of FIG. 6.
Figure 11:
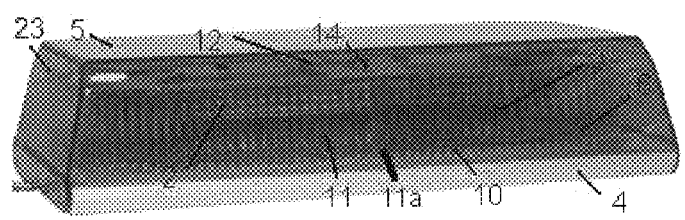
FIG. 11 is an example of a light bar with the interior lens of FIG. 4.

Fluted lens segments 11a are disposed in front of the parabolic reflectors 2. The interior of lens 10 is sized according to the height, width and length of reflectors 2 so that the bottom of lens 10 lies upon the surface of base 4, as shown in FIG. 11. Two spacers 20 may extend from frame 12 of the lens 10 to the circuit board 6 upon which the LED's 3 are mounted thereto in different banks with respect to their associated reflectors 2. The lens 10 thus extends continuously in a ribbon of parallel fluted lens segments 11a within dome 5 adjacent the front of reflectors 2. FIGS. 7 and 8 show top and elevation views of assembly 14. Base 4 lies horizontal with respect to the vertically fluted lens segments 11a (see FIGS. 11 and 12).

Figure 3:
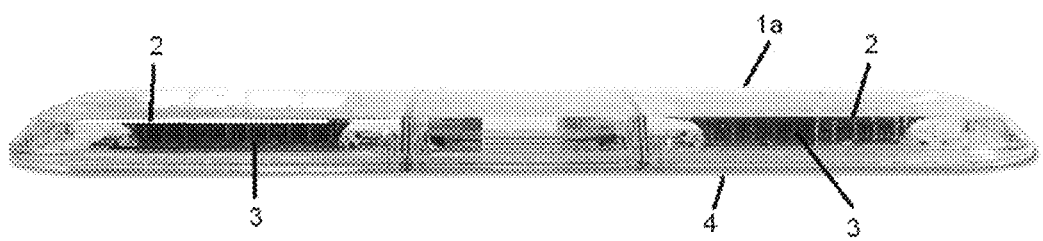
FIG. 3 is another example of a light bar of the prior art having two optical assemblies without the interior lens of the present invention.
Figure 12:
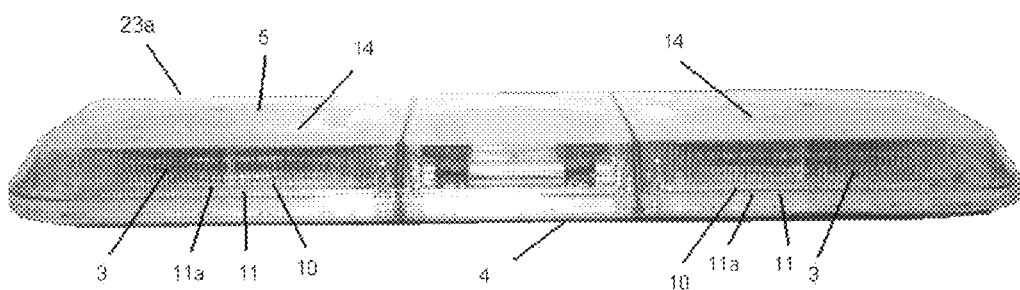
FIG. 12 is an example of another light bar having two of the interior lens of FIG. 4.

An example of a complete light bar 23 with interior lens 10 in assembly 14 is shown in FIG. 11, and also in FIG. 12 on a longer light bar 23a with two lenses 10 with left and right assemblies 14. In these examples, interior lenses 10 have been added to the light bars 1 and 1a of FIGS. 1 and 3, respectively, to provide light bar 23 and 23a, respectively.

In operation, the fluted lens segments 11a of lens 10 diffuse the light either emitted directly from LEDs 3, or via reflection by parabolic reflector 2, by refraction over a wide angle. Further, the fluted lens segments 11a assist in blending or mixing light side by side from different LEDs 3 thereby hindering viewer perception of the LED's as point light sources.

Lens 10 and its use in optical assembly 14 can provide the following advantageous features in light bars:

I. The vertical fluted lenses or lens segments 11a provide horizontal dispersion of light, allowing wider viewing angles of the individual LED's 3 than if lens 10 where not present.

II. The vertical fluted lenses of lens segments 11a provide for a larger more uniform lights source image size, whereas without lens 10, the individual LED's 3 can be seen more as hot spots.

III. The lens 10 snaps onto the existing light source reflector assemblies. This makes it quick and easy to install for manual assemblers inside light bar 23 and 23a in house (e.g., during manufacture of light bars), a quick add-on for distributors, and a quick upgrade add-on for end users.

IV. The lens 10 has two separate halves 13a and 13b, such that when it is desired to have different color light from different halves of assembly 14, each half may be composed of different color plastic so as to provide a filter of desired color of light from the light bar from LED illumination when incident such lens halves. This avoids the additional expense of providing different color LEDs in each half of the prior art assembly shown in FIG. 1. Further, the color of light from each half may be modified by merely replacing one half of one color with one of another color, without the expense of replacing LEDs and their associated circuitry with different color LEDs. Lens 10 can be molded in colors, and two of the same, or two lens halves 13a and 13b of different colors can be quickly and easily added inside the bar 23a to achieve numerous two-color light sources quickly and economically.

Although the lens 10 is shown for use in an optical assembly 14 for exterior roof mountable light bar, it may also be sized for use in other light bars such as mini-light bars or lower profile light bars than shown in FIGS. 11 and 12. Further, lens 10 may be provided in light bars different from that shown in the figures.

From the foregoing description, it will be apparent that there has been provided a lens which may be added to an existing light bar to provide improve light dispersion from light sources. Variations and modifications in the herein described interior lens, light bar with such lens, and its optical assembly within a light bar, within the scope of the invention will undoubtedly suggest themselves to those skilled in the art.

The invention claimed is:

1. An optical element for a light bar comprising:
   a body having a plurality of vertically disposed fluted lenses forming a ribbon shaped to receive illumination prior to exiting an outer dome of a light bar;
   wherein said body is a unitary structure of said fluted lenses in said ribbon which extends along at least one end of the light bar and then from said one end at least partially along two opposing elongated sides of the light bar when located in said light bar; and
   wherein said unitary structure of said body is separable from an optical assembly that provides said illumination along at least said opposing sides of said the light bar.

2. The optical element according to claim 1 wherein said fluted lenses extend in a first vertical dimension parallel to each other to increase the viewing angle of illumination from the light bar along a second horizontal dimension perpendicular to said first vertical dimension.

3. The optical element according to claim 1 wherein said optical assembly comprises light sources and parabolic reflectors located behind said light sources which reflect light therefrom towards the optical element.

4. The optical element according to claim 3 wherein said body of said optical element attaches to said reflectors.

5. The optical element according to claim 1 wherein said ribbon of fluted lenses continuously extends within the light bar around a perimeter of the optical assembly which is disposed upon a base.

6. The optical element according to claim 3 wherein said body of said optical element releasably attaches by clipping onto said reflectors.

7. The optical element according to claim 1 wherein said received illumination is produced by a plurality of light sources.

8. The optical element according to claim 7 wherein said light sources are LEDs.

9. The optical element according to claim 1 wherein said body is of one or more colors.

10. The optical element according to claim 1 wherein said body is separable from the outer dome and the optical assembly.

11. The optical element according to claim 1 wherein said ribbon along said one end curves as said ribbon transitions from said one end to said two opposing elongated sides.

12. A light bar comprising:
a base;
an optical assembly disposed upon said base providing illumination towards different sides of the light bar;
a dome covering said base to contain said optical assembly therein; and
a lens having a plurality of vertically disposed lens segments forming a structure which extends continuously along two opposing ends of the light bar and along two opposing ones of said sides of the light bar, said lens segments being shaped to increase the viewing angle of illumination from said optical assembly prior to exiting the light bar from said sides and said ends via said dome.

13. The light bar according to claim 12 wherein said lens segments each extend parallel to each other along a first dimension, and increase the viewing angle of illumination from the light bar along a second dimension perpendicular to said first dimension.

14. The light bar according to claim 13 wherein base extends along said second dimension.

15. The light bar according to claim 12 wherein said structure of lens segments forms a continuous ribbon extending around a perimeter of the optical assembly which provides illumination via said different sides of said light bar and said two opposite ends.

16. The light bar according to claim 15 wherein said structure is a unitary molded structure.

17. The light bar according to claim 12 wherein said optical assembly comprises a plurality of LED light sources and reflectors for reflecting light from said light sources toward said dome.

18. The light bar according to claim 12 wherein said lens is of one or more colors.

19. The light bar according to claim 12 further comprising a frame molded with said structure which extends at least above and across said optical assembly connecting parts of said structure that extends along said two opposing ones of said sides of the light bar.

20. The light bar according to claim 12 wherein said structure comprises a pair of unitary molded structures of said fluted lenses, each one of said pair extends along a different one of said opposing ends of the light bar and then from said one end at least partially along said two opposing elongated sides of the light bar.

21. The light bar according to claim 20 wherein each one of said pair of unitary structures is separable from the optical assembly.

* * * * *